(12) United States Patent
Deng

(10) Patent No.: US 10,503,024 B2
(45) Date of Patent: Dec. 10, 2019

(54) LIQUID CRYSTAL DISPLAY PANEL AND LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Zhuming Deng, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/951,404

(22) Filed: Apr. 12, 2018

(65) Prior Publication Data

US 2019/0155075 A1   May 23, 2019

Related U.S. Application Data

(63) Continuation of application No. PCT/CN2018/072719, filed on Jan. 15, 2018.

(30) Foreign Application Priority Data

Nov. 17, 2017  (CN) .......................... 2017 1 1143505

(51) Int. Cl.
   *G02F 1/1339*    (2006.01)
   *G02F 1/1335*    (2006.01)
   *G02F 1/1362*    (2006.01)

(52) U.S. Cl.
   CPC ...... *G02F 1/1339* (2013.01); *G02F 1/133512* (2013.01); *G02F 1/133514* (2013.01);
   (Continued)

(58) Field of Classification Search
   CPC ......... G02F 1/1339; G02F 2001/13396; G02F 1/133512; G02F 1/136209; G02F 1/136286
   See application file for complete search history.

(56) References Cited

U.S. PATENT DOCUMENTS

2009/0115947 A1   5/2009  Huang et al.
2013/0050619 A1*  2/2013  Kim ................... G02F 1/13394
                                                      349/106

(Continued)

FOREIGN PATENT DOCUMENTS

CN    101900911 A    12/2010
CN    104090427 A    10/2014
(Continued)

*Primary Examiner* — Jia X Pan
(74) *Attorney, Agent, or Firm* — Hemisphere Law, PLLC; Zhigang Ma

(57) ABSTRACT

An embodiment of the present invention discloses a liquid crystal display panel, including: first substrate; a main spacer and a sub-spacer, both disposed on the first substrate, a height of the main spacer is higher than a height of the sub-spacer; wherein an identification tag, disposed adjacent to one of the main spacer and the sub-spacer configured to identify the primary and sub-spacers. An embodiment of the present invention also discloses a liquid crystal display device. With the present invention, there are advantages of easy identification of the main spacer and the sub-spacer.

10 Claims, 2 Drawing Sheets

(52) U.S. Cl.
CPC .. *G02F 1/136209* (2013.01); *G02F 1/136286* (2013.01); *G02F 2001/13396* (2013.01)

(56) References Cited

U.S. PATENT DOCUMENTS

| | | | |
|---|---|---|---|
| 2013/0342795 A1* | 12/2013 | Park | G02F 1/133512 |
| | | | 349/110 |
| 2015/0103296 A1* | 4/2015 | Kwak | G02F 1/134309 |
| | | | 349/106 |
| 2016/0291374 A1* | 10/2016 | Fan | G02F 1/13394 |
| 2017/0315414 A1* | 11/2017 | Wang | G02F 1/133707 |

FOREIGN PATENT DOCUMENTS

| | | |
|---|---|---|
| CN | 104516158 A | 4/2015 |
| CN | 104849901 A | 8/2015 |
| CN | 105093581 A | 11/2015 |
| CN | 105892180 A | 8/2016 |
| CN | 105911775 A | 8/2016 |
| JP | 2014-240853 A | 12/2014 |
| WO | 2014/171347 A1 | 10/2014 |

* cited by examiner

--Prior Art--

LIQUID CRYSTAL DISPLAY PANEL AND LIQUID CRYSTAL DISPLAY DEVICE

RELATED APPLICATIONS

This application is a continuation application of POT Patent Application No. PCT/CN2018/072719, filed Jan. 15, 2018, which claims the priority benefit of Chinese Patent Application No. CN 201711143505.3, filed Nov. 17, 2017, which is herein incorporated by reference in its entirety.

FIELD OF THE DISCLOSURE

The disclosure relates to a display technical field, and especially to a liquid crystal display panel and a liquid crystal display device.

BACKGROUND

A conventional liquid crystal display panel, as shown in FIG. 1, generally includes an array substrate 110, a color filter substrate 120 and a liquid crystal layer there-between. In order to keep the gap between the array substrate 110 and the color filter substrate 120 consistent, some liquid crystal display panels also include a plurality of spacers including a main spacer 131 and a sub-spacer 132 for keeping the gap uniform.

Since the sizes of the main spacer and the sub-spacer on the horizontal projection are relatively close to each other and requirements on the main spacer and sub-spacer of a general liquid crystal display panel are different, it is necessary to identify the main spacer and the sub-spacer. However, none of the solutions of the prior art can be used to easily identify the main spacer and the sub-spacer.

SUMMARY

The technical problem to be solved in the embodiments of the present invention is to provide a liquid crystal display panel and a liquid crystal display. A main spacer and a sub-spacer can be easily identified by the identification tag.

In order to solve the above technical problem, an embodiment of the first aspect of the present invention provides a liquid crystal display panel, including: first substrate; a main spacer and a sub-spacer, both disposed on the first substrate, a height of the main spacer is higher than a height of the sub-spacer; and an identification tag, disposed adjacent to one of the main spacer and the sub-spacer configured to identify the primary and sub-spacers.

Wherein, a black matrix is disposed on the first substrate, the main spacer and the sub-spacer are both disposed on the black matrix, the black matrix is integrally formed with the main spacer and the sub-spacer.

Wherein, the identification tag is an identification hole formed by hollowing out a portion of the black matrix.

Wherein, a metal layer is under the identification hole, and the metal layer is opaque.

Wherein, the metal layer is a data line or a scan line.

Wherein, a dimension of the identification hole in the lengthwise direction is greater than or equal to 10 μm and a dimension of it in the widthwise direction is greater than or equal to 10 μm.

Wherein, a dimension of the identification hole in the lengthwise direction is smaller than a dimension of the metal layer in the lengthwise direction, and a dimension of the identification hole in the widthwise direction is smaller than a dimension of the metal layer in the widthwise direction.

Wherein, a number of the main spacers is less than a number of the sub-spacers, and the identification tag is disposed adjacent to the main spacer.

Wherein, a difference between projection sizes of the main spacer and the sub-spacer on a horizontal plane is less than 10%.

An embodiment of the first aspect of the present invention provides a liquid crystal display device, including the above liquid crystal display panel.

The implementation of the embodiments of the present invention has the following beneficial effects. Since the identification tag is disposed adjacent to the main spacer and the sub-spacer. Therefore, the main spacer and the sub-spacer can be indirectly identified through the identification tag, so that to make the identification convenient. After the main spacer and the sub-spacer are identified, and subsequent testing or processing of the main spacer and the sub-spacer can be facilitated. It can reduce difficulty of identification of process monitoring and also improve efficiency.

BRIEF DESCRIPTION OF THE DRAWINGS

To illustrate the embodiments of the present invention or the technical solutions to the prior art more clearly, accompanying drawings required for describing the embodiments or the prior art are introduced below briefly. Obviously, the accompanying drawings in the following description are merely some embodiments of the present invention, and a person of ordinary skill in the art may still derive other drawings from these accompanying drawings without creative efforts.

DETAILED DESCRIPTION OF PREFERRED EMBODIMENTS

In the following, the technical solutions in the embodiments of the present invention will be clearly and completely described with reference to the accompanying drawings of the embodiments of the present invention. Apparently, the described embodiments are merely some embodiments of the present invention, but not all embodiments. Based on the embodiments of the present invention, all other embodiments obtained by those of ordinary skill in the art without creative efforts shall fall within the protection scope of the present invention.

In the specification, the terms "including" and "including", and variations thereof, appearing in the claims and drawings, are intended to cover a non-exclusive inclusion, for example, a process comprising a series of steps or units, method, or apparatus is not limited to the steps or units listed, but may optionally include steps or units not listed or may optionally include additional steps or units inherent to the product or apparatus. In addition, the terms "first", "second", and "third" are used to distinguish different objects and are not intended to describe a particular order.

Figure 1:
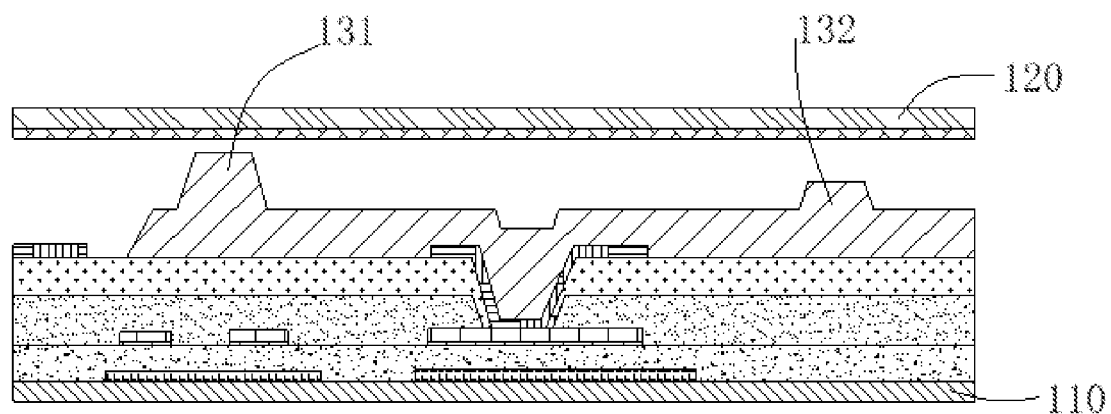
FIG. 1 is a cross-sectional view of a liquid crystal display panel in the prior art.
Figure 2:
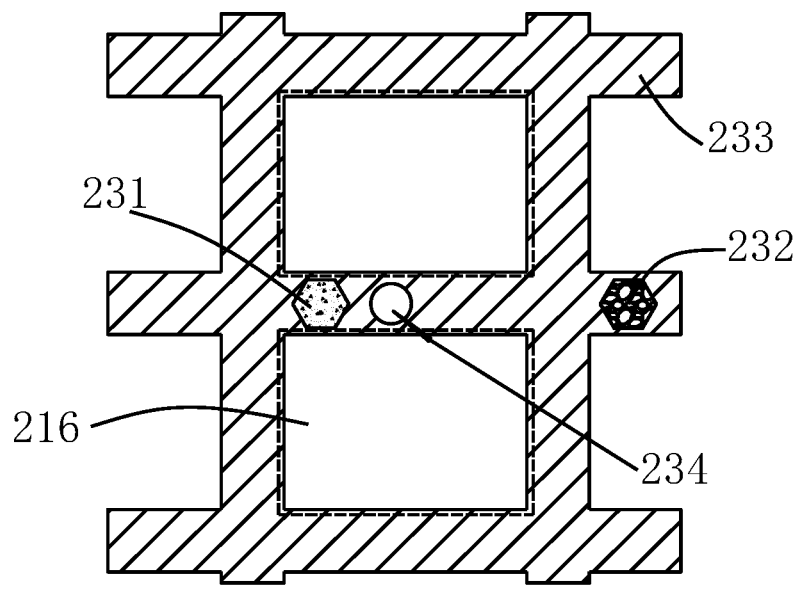
FIG. 2 is a schematic top view of a liquid crystal display panel according to an embodiment of the present invention.
Figure 3:
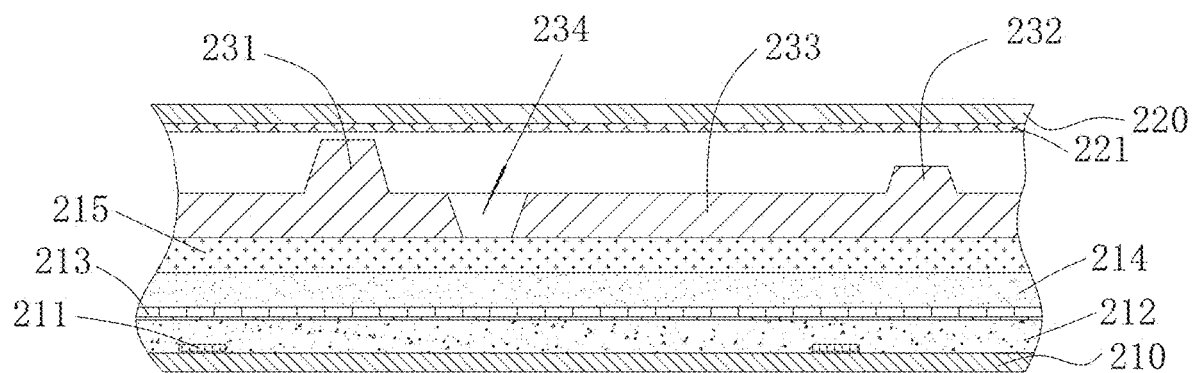
FIG. 3 is a schematic cross-sectional view of a liquid crystal display panel according to an embodiment of the present invention.

An embodiment of the present invention provides a liquid crystal display panel, please refer to FIG. 2 and FIG. 3, the liquid crystal display panel includes a first substrate 210, a main spacer 231, and sub-spacer 232.

In this embodiment, the first substrate 210 can be an array substrate, or a color filter substrate 220. When the first substrate 210 is an array substrate, the array substrate has no thin film transistor, scan line 211, data line 213, red color resistance, green color resistance, blue color resistance and etc. thereon. When the first substrate 210 is a color filter substrate 220, the first substrate 210 has no red color resistance, green color resistance, blue color resistance and etc. thereon.

In this embodiment, a number of the main spacer 231 is plural, a number of the sub-spacer 232 is plural, and the number of the main spacer 231 is smaller than the number of the sub-spacer 232. The main spacer 231 and the sub-spacer 232 both are disposed on the first substrate 210, and a height of the main spacer 231 greater than that of the sub-spacer 232. When the liquid crystal display panel is pressed, the main spacer 231 functions to resist pressure, and when it is squeezed to a certain degree, the main spacer 231 and the sub-spacer 232 work together to withstand the pressure.

In this embodiment, in order to separate the main spacer 231 and the sub-spacer 232, an identification tag is provided adjacent to one of the main spacer 231 and the sub-spacer 232. And when one of the two has an identification tag disposed adjacent, it is able to identify the spacer adjacent to the identification tag is the main spacer 231 or the sub-spacer 232, and thus the spacer without an identification tag adjacent to is the other kind of spacers. Therefore, the main spacer 231 and sub-spacer 232 can be identified by the identification tag. In this embodiment, the identification tag is disposed adjacent to the main spacer 231, and the advantages of this arrangement are: less identification tags are needed since there are less number of the main spacers 231 than the sub-spacers 232 so that identification is simple and cost is low. Of course, in other embodiments of the present invention, the identification tag may also be disposed adjacent to the sub-spacer. In this embodiment, one identification tag is matched with one main spacer 231. In other embodiments of the present invention, multiple identification tags may be combined with one main spacer.

In this embodiment, the main spacer 231 and the sub-spacer 232 can be indirectly identified by identifying the identification tag dispose adjacent to one of the main spacers 231 and the aux sub-spacers 232 so as to easily identify. After the main spacer and the sub-spacer are identified, and subsequent testing or processing of the main spacer and the sub-spacer can be facilitated. It can reduce identification difficulty of process monitoring and increase efficiency.

In this embodiment, a black matrix 233 is further disposed on the first substrate 210. Both the main spacer 231 and the sub-spacer 232 are located on the black matrix 233. The black matrix 233 uses the same material, which is a black organic material, as the main spacer 231 and the sub-spacer 232. The three are integrally formed to manufacture the black matrix 233, the main spacer 231 and the sub-spacer 232, and it is very convenient and the process can be saved. In this embodiment, a difference between sizes of projections of the main spacer 231 and the sub-spacer 232 on a horizontal plane is less than 10%, so that they are difficult to be identified by themselves. For example, the difference between the projection scales in a lengthwise direction is less than 10%; the difference between the projection scales in a widthwise direction is less than 10%.

In this embodiment, the identification tag is an identification hole 234 formed by hollowing out the black matrix 233, and the identification hole 234 is a circular through hole. In order to identify the mark identification hole 234 more clearly, in the embodiment, the size of the identification hole 234 in the lengthwise direction is greater than or equal to 10 μm, for example, 10 μm, 15 μm, 20 μm, 25 μm, 30 μm, 35 μm, 40 μm and so forth. In this case, the dimension in the lengthwise direction is the diameter of the circular through hole. The size of the identification hole 234 in the widthwise direction is greater than or equal to 10 μm, for example, 10 μm, 15 μm, 20 μm, 25 μm, 30 μm, 35 μm, 40 μm, and so forth. In this case, the dimension in the widthwise direction is the diameter of the circular through hole. Of course, in other embodiments of the present invention, the identification hole may also be a rectangular through hole, a hexagonal through hole, a triangular through hole or the like.

In order to prevent the light of the backlight behind the liquid crystal display panel from being projected through the through hole and the influence on the user's vision is caused. In this embodiment, a metal layer is under the identification hole 234, and the metal layer is opaque; thus the light of the backlight can be prevented from entering the identification hole 234 and being seen by the user. Moreover, since the light-impermeable metal member is disposed under the identification hole 234, the user can easily recognize the identification hole 234 by reflecting light reflected by the metal layer under the hole 234 when identifying the main spacer 231, and further the main spacer 231 of the present embodiment near the identification hole 234 is identified. In this embodiment, the number of the main spacers 231 are relatively small and thereby the number of the identification holes 234 is also relatively small, so that the influence of the reflected light by the metal layer under the identification hole 234 on the user's vision is also relatively small. In this embodiment, the size of the identification hole 234 in the lengthwise direction is smaller than the size of the metal layer in the lengthwise direction. The size of the identification hole 234 in the widthwise direction is smaller than the size of the metal layer in the widthwise direction, so that the light of the backlight can blocked by the metal layer.

In this embodiment, the metal layer is a horizontally extending scan line 211. The material of the scan line 211 is a single metal or an alloy. Generally speaking, the material of the scan line 211 is Mo, Al alloy, or Ti, Al alloy. In other embodiments of the present invention, the alloy layer is a longitudinally extending data line. The material of the data line may be a single layer of metal or alloy, and the material of the data line is generally Mo or Al alloy. In general, the size of the black matrix 233 in the widthwise direction is larger than that of the scan lines 211 in the widthwise direction, and the size of the black matrix 233 in the lengthwise direction is larger than the size of the data lines 213 in the lengthwise direction.

In addition, in this embodiment, the first substrate 210 is an array substrate, and the array substrate is further provided with a scan line 211, a gate electrode, a gate insulation layer 212, a semiconductor layer, a data line 213, a source, a drain, a color filter layer 214, an organic planarization layer 215, a pixel electrode layer. The color filter layer 214 of the present embodiment is disposed on the array substrate, and the black matrix 233 is disposed on the pixel electrode layer and the organic planarization layer 215. In this embodiment, the number of the scan lines 211 is plural and they extend in the horizontal direction. The number of the data lines 213 is plural and they extend in the vertical direction. The scan lines 211 cross the data lines 213 to form a plurality of pixel regions 216. In this embodiment, the identification tag adjacent to the main spacer 231 and the corresponding main spacer 231 are located between two adjacent data lines 213 and located above the same scan line 211. In other embodiments of the present invention, the identification tag adjacent to the main spacer and the corresponding main spacer are located between two adjacent scan lines and located above the same data line. In this embodiment, the liquid crystal display panel further includes a color filter substrate 220. The color filter substrate 220 has a common electrode 221 thereon. In addition, in other embodiments of the present invention, the color filter layer, the black matrix, the main spacer and the sub-spacer may be further disposed on the color filter substrate.

An embodiment of the present invention further provides a liquid crystal display device. The liquid crystal display device includes a backlight module and the above liquid crystal display panel. The backlight module is configured to emit light, and the backlight module is disposed at a rear of the liquid crystal display panel.

It should be noted that, each embodiment in this specification is described in a progressive manner, and each embodiment focuses on differences from other embodiments. The same and similar parts among the embodiments can be referred to each other. Since the apparatus embodiment is basically similar to the method embodiments, the description is relatively simple, and for the relevant parts, references may be made to the part of the method embodiments.

The above disclosure is only the preferred embodiments of the present invention, and certainly cannot be used to limit the scope of the present invention. Therefore, equivalent changes made according to the claims of the present invention are still within the scope of the present invention.

What is claimed is:

1. A liquid crystal display panel, comprising:
   a first substrate;
   a main spacer and a sub-spacer, both disposed on the first substrate, a height of the main spacer is higher than a height of the sub-spacer; and
   an identification tag, disposed adjacent to one of the main spacer and the sub-spacer configured to identify the main spacer and the sub-spacer,
   wherein a black matrix is disposed on the first substrate, the main spacer and the sub-spacer are both disposed on the black matrix, and the black matrix is integrally formed with the main spacer and the sub-spacer,
   wherein the identification tag is an identification hole formed by hollowing out a portion of the black matrix,
   wherein a metal layer is under the identification hole, and the metal layer is opaque, and
   wherein a dimension of the identification hole in the lengthwise direction is smaller than a dimension of the metal layer in the lengthwise direction, and a dimension of the identification hole in the widthwise direction is smaller than a dimension of the metal layer in the widthwise direction.

2. The liquid crystal display panel according to claim 1, wherein the metal layer is a data line or a scan line.

3. The liquid crystal display panel according to claim 1, wherein a dimension of the identification hole in the lengthwise direction is greater than or equal to 10 μm and a dimension of it in the widthwise direction is greater than or equal to 10 μm.

4. The liquid crystal display panel according to claim 2, wherein a dimension of the identification hole in the lengthwise direction is greater than or equal to 10 μm and a dimension of it in the widthwise direction is greater than or equal to 10 μm.

5. The liquid crystal display panel according to claim 1, wherein a number of the main spacers is less than a number of the sub-spacers, and the identification tag is disposed adjacent to the main spacer.

6. The liquid crystal display panel according to claim 1, wherein a difference between sizes of projections of the main spacer and the sub-spacer on a horizontal plane is less than 10%.

7. A liquid crystal display device comprises a liquid crystal display panel, which comprises:
   a first substrate;
   a main spacer and a sub-spacer, both disposed on the first substrate, a height of the main spacer is higher than a height of the sub-spacer; and
   an identification tag, disposed adjacent to one of the main spacer and the sub-spacer configured to identify the main spacer and the sub-spacer,
   wherein a black matrix is disposed on the first substrate, the main spacer and the sub-spacer are both disposed on the black matrix, the black matrix is integrally formed with the main spacer and the sub-spacer,
   wherein the identification tag is an identification hole formed by hollowing out a portion of the black matrix,
   wherein a metal layer is under the identification hole, and the metal layer is opaque, and
      wherein a dimension of the identification hole in the lengthwise direction is smaller than a dimension of the metal layer in the lengthwise direction, and a dimension of the identification hole in the widthwise direction is smaller than a dimension of the metal layer in the widthwise direction.

8. The liquid crystal display device according to claim 7, wherein the metal layer is a data line or a scan line.

9. The liquid crystal display device according to claim 7, wherein a dimension of the identification hole in the lengthwise direction is greater than or equal to 10 μm and a dimension of it in the widthwise direction is greater than or equal to 10 μm.

10. The liquid crystal display device according to claim 7, wherein a difference between sizes of projections of the main spacer and the sub-spacer on a horizontal plane is less than 10%.

* * * * *